(12) United States Patent
Park et al.

(10) Patent No.: US 8,158,024 B2
(45) Date of Patent: Apr. 17, 2012

(54) LIQUID CRYSTAL DISPLAY

(75) Inventors: Joon-Hyung Park, Seoul (KR); Jin-Lak Kim, Osan-si (KR); Jeong-Uk Heo, Seongnam-si (KR); Seong-Nam Lee, Seoul (KR); Jang-Hyun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 193 days.

(21) Appl. No.: 12/534,242

(22) Filed: Aug. 3, 2009

(65) Prior Publication Data
US 2010/0225841 A1 Sep. 9, 2010

(30) Foreign Application Priority Data
Mar. 3, 2009 (KR) .................. 10-2009-0018169

(51) Int. Cl.
*C09K 19/00* (2006.01)
*C09K 19/06* (2006.01)
*C09K 19/32* (2006.01)
*C09K 19/52* (2006.01)

(52) U.S. Cl. ........... 252/299.63; 252/299.01; 252/299.6; 252/299.66; 428/1.1; 349/143; 349/182; 430/20

(58) Field of Classification Search ............. 252/299.01, 252/299.6, 299.63, 299.66; 428/1.1; 349/143, 349/182; 430/20
See application file for complete search history.

(56) References Cited

U.S. PATENT DOCUMENTS

| | | | |
|---|---|---|---|
| 2009/0295693 A1* | 12/2009 | Yeom et al. ................. | 345/88 |
| 2009/0309066 A1* | 12/2009 | Klasen-Memmer et al. ................. | 252/299.61 |
| 2010/0123843 A1* | 5/2010 | Kim et al. ................. | 349/39 |

* cited by examiner

*Primary Examiner* — Geraldina Visconti
(74) *Attorney, Agent, or Firm* — Cantor Colburn LLP

(57) ABSTRACT

A liquid crystal display includes a first substrate; a second substrate facing the first substrate; a pair of field generating electrodes disposed on at least one of the first and the second substrates; and a liquid crystal layer disposed between the first and the second substrates; wherein the liquid crystal layer includes a liquid crystal composition including a polar compound, the polar compound including a compound represented by Formula 1:

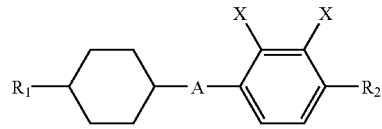

Formula 1 wherein A represents

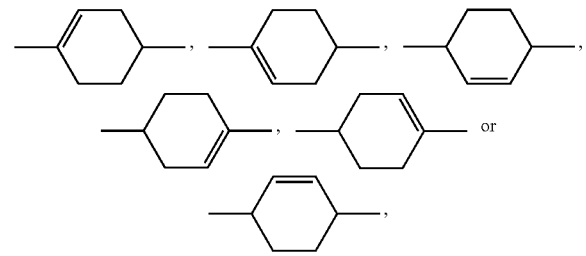

X is a halogen, $R_1$ is a substituted or unsubstituted $C_1$-$C_{10}$ alkyl group or a substituted or unsubstituted $C_1$-$C_{10}$ alkoxy group and $R_2$ is a $C_1$-$C_5$ alkyl group or a $C_1$-$C_5$ alkoxy group.

20 Claims, 12 Drawing Sheets

LIQUID CRYSTAL DISPLAY

This application claims priority to Korean Patent Application No. 10-2009-0018169, filed on Mar. 3, 2009, all the benefits accruing therefrom under 35 U.S.C. §119, the content of which is herein incorporated by reference.

BACKGROUND OF THE INVENTION (a) Field of the Invention

The present disclosure relates to a liquid crystal display.

(b) Description of the Related Art

A liquid crystal display is a widely used type of flat panel display. A liquid crystal display includes two display panels on which field generating electrodes, such as a pixel electrode and common electrode, are disposed, and includes a liquid crystal layer, which is interposed between the panels. In a liquid crystal display, voltages are applied to the field generating electrodes so as to generate an electric field over a liquid crystal layer, and then the alignment of liquid crystal molecules of the liquid crystal layer is determined by the electric field. Accordingly, the polarization of incident light is controlled, thereby displaying an image.

In a liquid crystal display, it is very desirable to provide a liquid crystal material suitable for control of the transmittance of light and display of a desired image. Particularly, the driving frequency of the liquid crystal display may be a criterion for determining the motion picture display quality, and techniques have been developed in order to drive the liquid crystal display with a high driving frequency, such as 60 Hz, 120 Hz or 240 Hz, for example.

BRIEF SUMMARY OF THE INVENTION

In an exemplary embodiment, disclosed is a liquid crystal display including a first substrate, a second substrate facing the first substrate, a pair of field generating electrodes disposed on at least one of the first and the second substrates, and a liquid crystal layer disposed between the first and the second substrates. The liquid crystal layer includes a liquid crystal composition containing a polar compound, the polar compound including a compound represented by Formula 1:

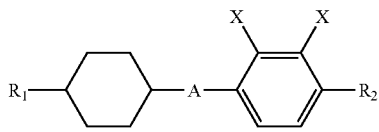

Formula 1 wherein A represent;

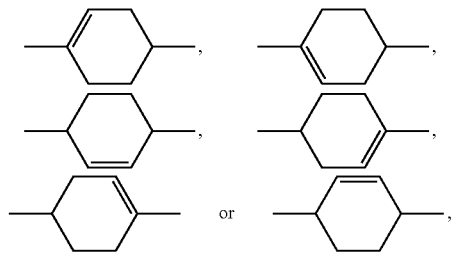

X represents a halogen, $R_1$ represents a substituted or unsubstituted $C_1$-$C_{10}$ alkyl group or a substituted or unsubstituted $C_1$-$C_{10}$ alkoxy group and $R_2$ represents a $C_1$-$C_5$ alkyl group or a $C_1$-$C_5$ alkoxy group.

The liquid crystal composition may further contain a neutral compound, and the neutral compound may include a compound represented by Formula 2:

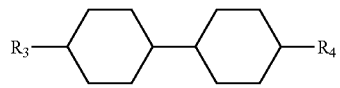

Formula 2 wherein each of $R_3$ and $R_4$ independently represents a $C_1$-$C_5$ alkyl group, a compound represented by Formula 3:

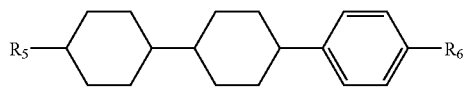

Formula 3 wherein each of $R_5$ and $R_6$ independently represents a $C_1$-$C_5$ alkyl group, or a mixture thereof.

The content of the compound represented by the Formula 1 may be about 5 weight percent (wt %) to about 15 wt %, and the content of the compound represented by the Formula 2, the content of the compound represented by the Formula 3 or the content of the mixture thereof may be about 20 wt % to about 30 wt %, based on the total weight of the liquid crystal composition.

The liquid crystal display may have a driving frequency of about 240 hertz (Hz).

The liquid crystal layer may have a thickness of about 3.1 micrometers (μm) to about 3.3 μm.

The liquid crystal composition may have a refractive anisotropy (Δn) of about 0.100 to about 0.103.

The liquid crystal composition may have a dielectric anisotropy (Δε) of about −3.2 to about −2.7.

The liquid crystal composition may have a rotational viscosity of about 90 millipascal seconds (mPa·s) to about 125 mPa·s.

The liquid crystal composition may have a phase transition temperature Tni of about 72° C. to about 80° C.

The neutral compound may further contain a compound represented by Formula 4:

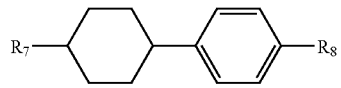

Formula 4 wherein $R_7$ represents a substituted or unsubstituted $C_1$-$C_{10}$ alkyl group or a substituted or unsubstituted $C_1$-$C_{10}$ alkoxy group and $R_8$ represents a $C_1$-$C_5$ alkyl group or a $C_1$-$C_5$ alkoxy group, a compound represented by Formula 5:

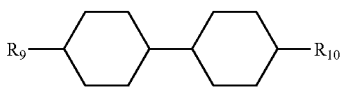

Formula 5 wherein $R_9$ represents a substituted or unsubstituted $C_1$-$C_{10}$ alkyl group or a substituted or unsubstituted $C_1$-$C_{10}$ alkoxy group and $R_{10}$ represents a $C_1$-$C_5$ alkyl group or a $C_1$-$C_5$ alkoxy group, or a mixture thereof.

The polar compound may further contain at least one compound selected from a compound represented by Formula 6:

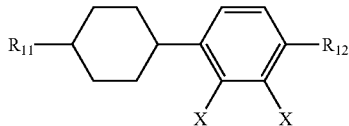

Formula 6 wherein X represents a halogen, $R_{11}$ represents a substituted or unsubstituted $C_1$-$C_{10}$ alkyl group or a substituted or unsubstituted $C_1$-$C_{10}$ alkoxy group and $R_{12}$ represents a $C_1$-$C_5$ alkoxy group, a compound represented by Formula 7:

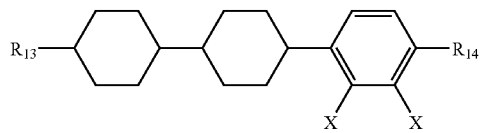

Formula 7 wherein X represents a halogen, $R_{13}$ is a substituted or unsubstituted $C_1$-$C_{10}$ alkyl group or a substituted or unsubstituted $C_1$-$C_{10}$ alkoxy group and $R_{14}$ represents a $C_1$-$C_5$ alkoxy group, a compound represented by Formula 8:

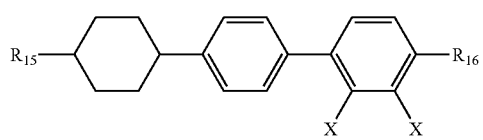

Formula 8 wherein X represents a halogen, $R_{15}$ is a substituted or unsubstituted $C_1$-$C_{10}$ alkyl group or a substituted or unsubstituted $C_1$-$C_{10}$ alkoxy group and $R_{16}$ represents a $C_1$-$C_5$ alkoxy group, and a compound represented by Formula 9:

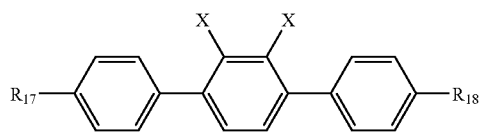

Formula 9 wherein X represents a halogen, $R_{17}$ represents a substituted or unsubstituted $C_1$-$C_{10}$ alkyl group or a substituted or unsubstituted $C_1$-$C_{10}$ alkoxy group and $R_{18}$ represents a $C_1$-$C_5$ alkoxy group, or a mixture thereof.

The field generating electrode may include a pixel electrode, and the pixel electrode may include a first sub-pixel electrode and a second sub-pixel electrode.

The liquid crystal display may further include a first thin film transistor comprising a first gate electrode, a first source electrode and a first drain electrode electrically connected to the first sub-pixel electrode, a second thin film transistor containing a second gate electrode, a second source electrode and a second drain electrode electrically connected to the second sub-pixel electrode, and a third thin film transistor containing a third gate electrode, a third drain electrode and a third source electrode electrically connected to the second sub-pixel electrode.

A first gate signal may be applied to the first and the second gate electrodes, a second gate signal may be applied to the third gate electrode, a same data signal may be applied to the first and the second source electrodes and the second drain electrode and the third source electrode may be electrically connected to each other.

The liquid crystal display may further include a step-down capacitor electrically connected to the third drain electrode, and a step-up capacitor electrically connected to the third drain electrode and the second sub-pixel electrode.

In a liquid crystal display having a high driving frequency, such as about 240 Hz or the like, the response time and the motion picture defects may decrease, and the surface and the linear afterimages may be reduced.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE INVENTION

Figure 1:
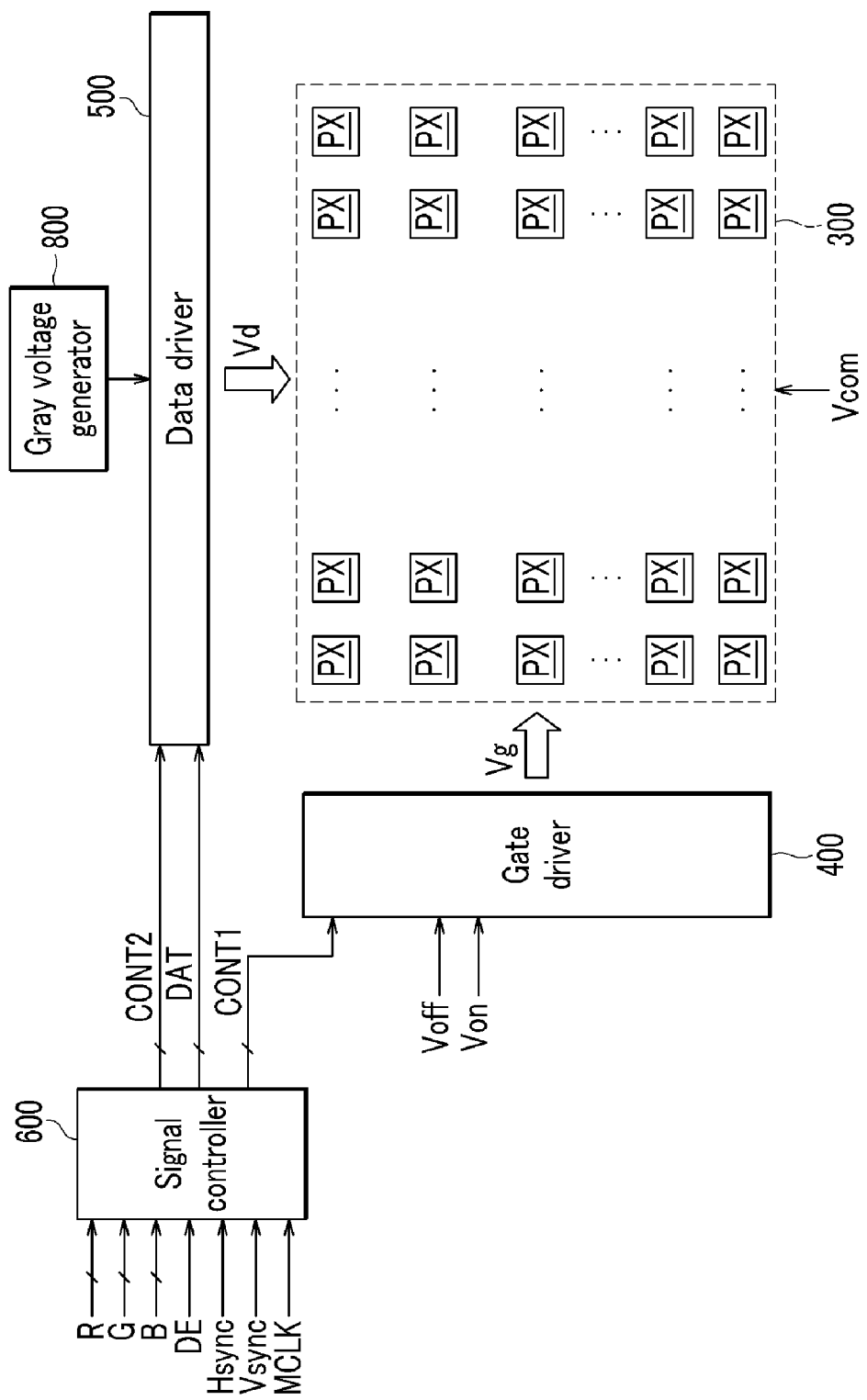
FIG. 1 is a block diagram illustrating an exemplary embodiment of a liquid crystal display.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings, irrelevant portions are omitted to more clearly describe the present invention, and like reference numerals designate like elements throughout the specification. Furthermore, additional detailed description of well-known art is omitted for clarity.

In the drawings, the thickness of layers, films, panels, regions, etc., are exaggerated for clarity. It will be understood that when an element such as a layer, film, region or substrate is referred to as being "on" another element, it can be directly on the other element or intervening elements may also be present. In contrast, when an element is referred to as being "directly on" another element, there are no intervening elements present. On the contrary, it will be understood that when an element such as a layer, film, region or substrate is referred to as being "under" another element, it can be directly under the other element or intervening elements may also be present. In contrast, when an element is referred to as being "directly under" another'element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected.

Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A liquid crystal composition according to an exemplary embodiment will be now described in further detail.

A liquid crystal composition according to an exemplary embodiment may be used in a liquid crystal display, which is driven at a high driving frequency, such as 240 hertz (Hz) or the like, and includes a polar compound containing a compound represented by Formula 1.

Formula 1

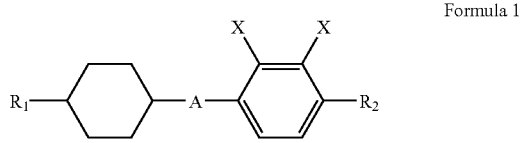

In the Formula 1, A represents

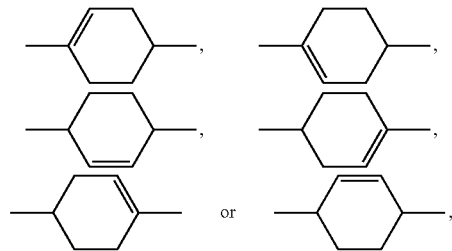

and X represents a halogen, $R_1$ represents a substituted or unsubstituted $C_1$-$C_{10}$ alkyl group or a substituted or unsubstituted $C_1$-$C_{10}$ alkoxy group and $R_2$ represents a $C_1$-$C_5$ alkyl group or a $C_1$-$C_5$ alkoxy group. The substituent may be a $C_1$-$C_5$ alkyl group. In an embodiment, the halogen may be F or Cl.

While not wanting to be bound by theory, in the compound represented by Formula 1, the elastic constant K is increased due to the rigid ring structure thereof, and when the rotational viscosity of the liquid crystal composition is lowered, the elastic constant K may be minimized. Furthermore, as the compound represented by Formula 1 contains double bonds, it may improve the rotational viscosity of the liquid crystal composition. In addition, since the compound represented by Formula 1 may have increased polarity, the liquid crystal composition may contain a neutral compound and in an embodiment wherein the content of the neutral compound is increased, the rotational viscosity of the composition is reduced.

In an embodiment, the double bonds of the compound represented by Formula 1 are sterically hindered compared with a commercially available neutral compound with alkenyl groups, and hence, may have lowered reactivity or lowered affinity with ionic impurities compared with the commercially available neutral compounds. Accordingly, use of a composition comprising the compound represented by the Formula 1 may reduce linear afterimages as compared a composition comprising a commercially available neutral compound with alkenyl groups. Comparing a liquid crystal display, which operates at about 240 Hz, to a liquid crystal display, which operates at about 120 Hz, a concentration of the ionic impurities, which are not adsorbed onto the alignment layer and may float or be suspended in the liquid crystal layer, may increase. Accordingly, since the ionic impurities tend to be collimated as lines due to the lateral electric field, the quantity of linear afterimages may be further reduced.

The polar compound, particularly a compound represented by Formula 1, may be contained in an amount of about 1 weight percent (wt %) to about 20 wt %, specifically about 5 wt % to about 15 wt %, more specifically about 10 wt % of the liquid crystal composition. Within this range, the afterimages of the liquid crystal display, which has a high driving frequency of about 240 Hz, or the like may be reduced or effectively prevented.

The liquid crystal composition may further contain a neutral compound, and the neutral compound may include a compound represented by Formula 2, a compound represented by Formula 3 or a mixture thereof.

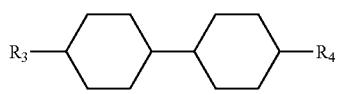

Formula 2

In Formula 2, each of $R_3$ and $R_4$ independently represent a $C_1$-$C_5$ alkyl group.

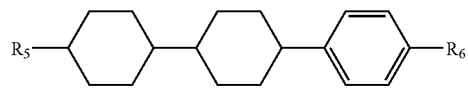

Formula 3

In Formula 3, each of $R_5$ and $R_6$ independently represent a $C_1$-$C_5$ alkyl group.

The neutral compound, particularly a compound represented by Formula 2 or Formula 3, may be contained in an amount of about 10 wt % to about 40 wt %, specifically about 20 wt % to about 30 wt %, more specifically about 25 wt % of the liquid crystal composition. Also, a mixture comprising the compound represented by Formula 2 and Formula 3 may be contained in an amount of about 10 wt % to about 40 wt %, specifically about 20 wt % to about 30 wt %, more specifically about 25 wt % of the liquid crystal composition. When included in this range, afterimages in the liquid crystal display, which operates at a high driving frequency of about 240 Hz, or the like, may be reduced or effectively prevented.

The neutral compound may further contain a compound represented by Formula 4, a compound represented by Formula 5 or a mixture thereof.

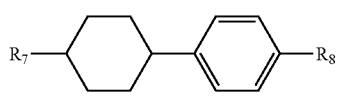

Formula 4

In Formula 4, $R_7$ represents a substituted or unsubstituted $C_1$-$C_{10}$ alkyl group or a substituted or unsubstituted $C_1$-$C_{10}$ alkoxy group and $R_8$ represents a $C_1$-$C_5$ alkyl group or a $C_1$-$C_5$ alkoxy group.

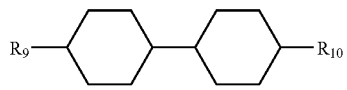

Formula 5

In Formula 5, $R_9$ represents a substituted or unsubstituted $C_1$-$C_{10}$ alkyl group or a substituted or unsubstituted $C_1$-$C_{10}$ alkoxy group and $R_{10}$ represents a $C_1$-$C_5$ alkyl group or a $C_1$-$C_5$ alkoxy group.

For example, the compound represented by Formula 4 may be contained in an amount of about 1 wt % to about 20 wt %, specifically about 3 wt % to about 13 wt %, more specifically about 8 wt % of the liquid crystal composition. Furthermore, the compound represented by the Formula 5 may be contained in an amount of about 1 wt % to about 20 wt %, specifically about 3 wt % to about 10 wt %, more specifically about 6 wt % of the liquid crystal composition.

The liquid crystal composition may contain at least one compound selected from the group consisting of a polar compound represented by Formula 6, a polar compound represented by Formula 7, a polar compound represented by Formula 8, a polar compound represented by Formula 9 and the like.

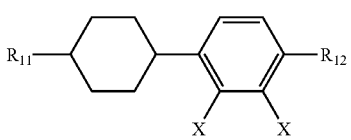

Formula 6

In Formula 6, X represents a halogen, $R_{11}$ represents a substituted or unsubstituted $C_1$-$C_{10}$ alkyl group or a substituted or non-substituted $C_1$-$C_{10}$ alkoxy group and $R_{12}$ represents a $C_1$-$C_5$ alkoxy group. In an embodiment, X represents F or Cl.

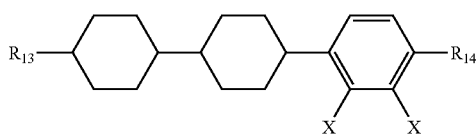

Formula 7

In Formula 7, X represents a halogen, $R_{13}$ represents a substituted or unsubstituted $C_1$-$C_{10}$ alkyl group or a substituted or unsubstituted $C_1$-$C_{10}$ alkoxy group and $R_{14}$ represents a $C_1$-$C_5$ alkoxy group. In an embodiment, X represents F or Cl.

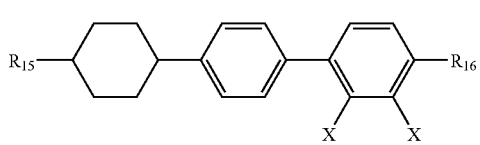

Formula 8

In the Formula 8, X represents a halogen, $R_{15}$ represents a substituted or unsubstituted $C_1$-$C_{10}$ alkyl group or a substituted or unsubstituted $C_1$-$C_{10}$ alkoxy group and $R_{16}$ represents a $C_1$-$C_5$ alkoxy group. In an embodiment, X represents F or Cl.

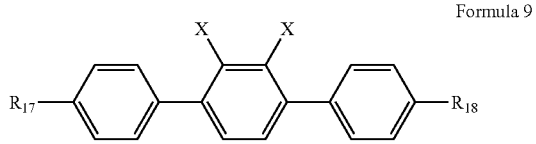

Formula 9

In Formula 9, X represents a halogen, $R_{17}$ represents a substituted or unsubstituted $C_1$-$C_{10}$ alkyl group or a substituted or unsubstituted $C_1$-$C_{10}$ alkoxy group and $R_{18}$ represents a $C_1$-$C_5$ alkoxy group. In an embodiment, X represents F or Cl.

For example, the compound represented by the Formula 6 may be contained in an amount of about 5 wt % to about 40 wt %, specifically about 10 wt % to about 20 wt %, more specifically about 15 wt % of the liquid crystal composition. Furthermore, the compound represented by Formula 7 may be contained in an amount of about 1 wt % to about 20 wt %, specifically about 3 wt % to about 13 wt %, more specifically about 8 wt % of the liquid crystal composition. The compound represented by Formula 8 may be contained in an amount of about 1 wt % to about 30 wt %, specifically about 7 wt % to about 17 wt %, more specifically about 12 wt % of the liquid crystal composition. The compound represented by Formula 9 may be contained in an amount of about 1 wt % to about 30 wt %, specifically about 6 wt % to about 17 wt %, more specifically about 11 wt % of the liquid crystal composition.

The liquid crystal composition may be added into a liquid crystal display, which operates at a frequency of about 240 Hz, to maintain a certain cell gap. The cell gap may be selected to have a value, which reduces the afterimages, wherein the afterimages may be a ghost, bounce blur or tail blur, which may occur when motion pictures are displayed in a liquid crystal display, which operates at a frequency of about 120 Hz. The cell gap may be about 3.0 micrometers (μm) to about 3.5 μm, specifically about 3.1 μm to about 3.3 μm, more specifically about 3.2 μm. In an embodiment, ghost, bounce blur, tail blur or the like may be further reduced or effectively eliminated, and the contrast ratio may be further enhanced.

Furthermore, the refractive anisotropy (Δn) of the liquid crystal composition may be selected in consideration of the cell gap range. When the cell gap is about 3.1 μm to about 3.3 μm, the refractive anisotropy may be about 0.100 to about 0.103, and in this case, the lateral visibility may be further enhanced.

Meanwhile, the dielectric anisotropy (Δε) of the liquid crystal composition may be selected in view of the cell gap range so as to lower the rotational viscosity of the liquid crystal composition. When the cell gap is about 3.1 μm to about 3.3 μm, the dielectric anisotropy may be about −3.2 to about −2.7, and in this embodiment, the processing margin for lowering the rotational viscosity of the liquid crystal composition may be expanded.

The rotational viscosity of the liquid crystal composition may be about 80 millipascal seconds (mPa·s) to about 150 mPa·s, specifically about 90 mPa·s to 125 mPa·s, more specifically about 110 mPa·s. In this embodiment, when the liquid crystal display uses a high driving frequency of about 240 Hz, or the like, ghost, bounce blur, tail blur or the like may be further reduced or effectively eliminated.

The phase transition temperature ("Tni") of the liquid crystal composition may be about 65° C. to about 90° C., more specifically about 72° C. to about 80° C. In this embodiment, the rotational viscosity of the liquid crystal composition is further prevented from being increased.

A liquid crystal display according to an exemplary embodiment will be now described in further detail with reference to FIG. 1 to FIG. 3. Any repetitive description of the liquid crystal composition will be omitted for clarity.

FIG. 1 is a block diagram illustrating an exemplary embodiment of a liquid crystal display. FIG. 2 is a schematic diagram illustrating the structure of an exemplary embodiment of a liquid crystal display and an equivalent circuit of two sub-pixels thereof. FIG. 3 is an equivalent circuit diagram of an exemplary embodiment of a pixel of a liquid crystal display.

Figure 2:
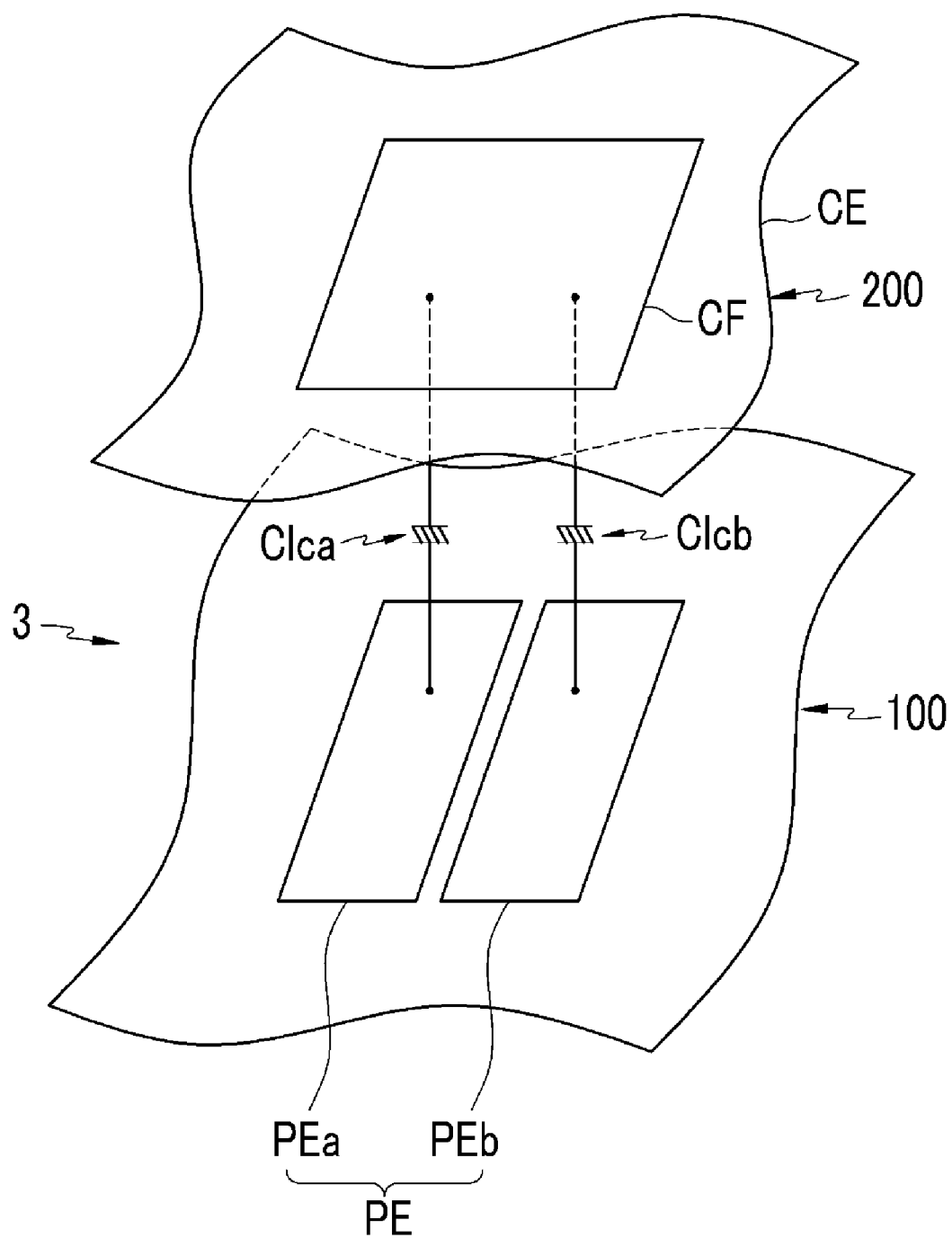
FIG. 2 is a schematic diagram illustrating the structure of an exemplary embodiment of a liquid crystal display and an equivalent circuit of two sub-pixels thereof.
Figure 3:
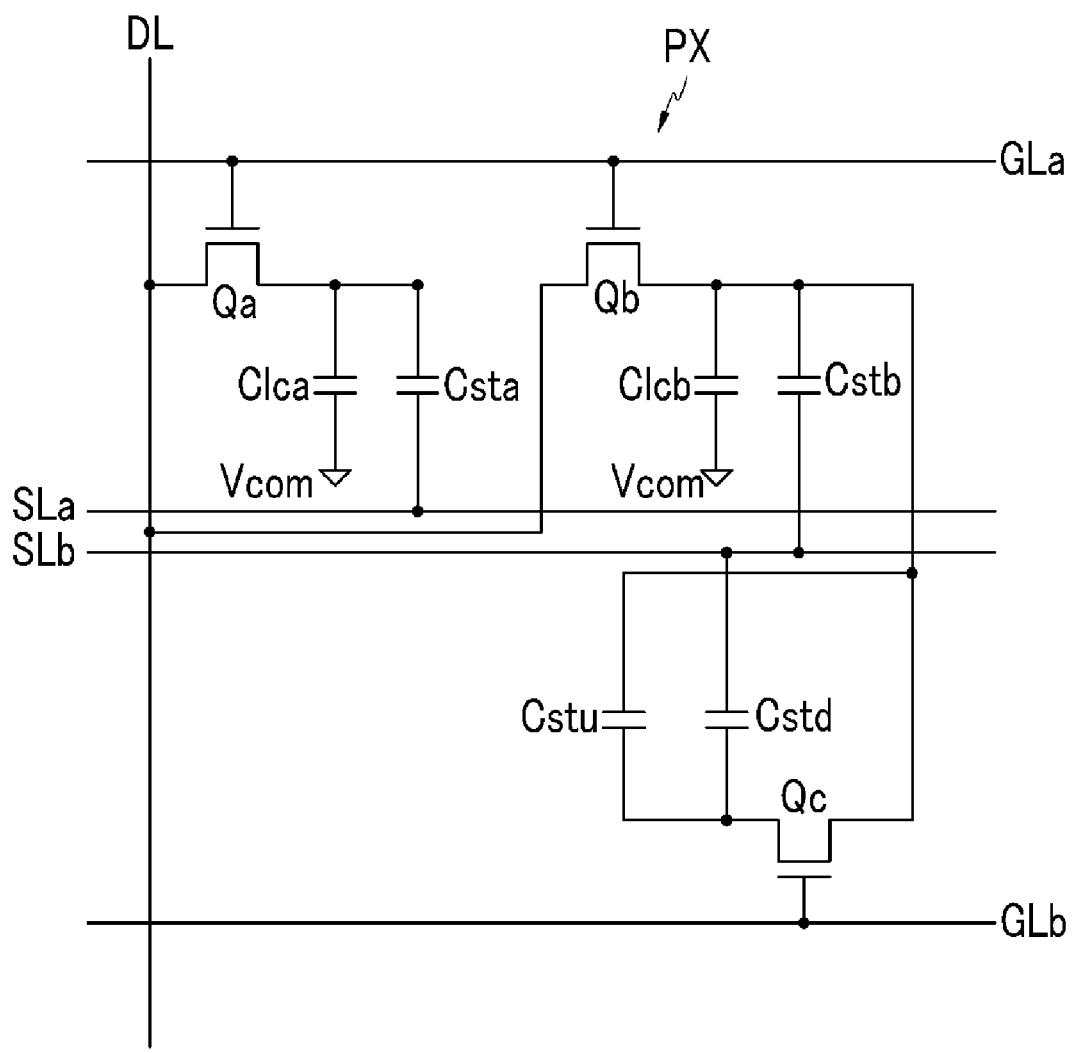
FIG. 3 is an equivalent circuit diagram of an exemplary embodiment of a pixel of a liquid crystal display.

The liquid crystal display shown in FIG. 1 to FIG. 3 may have a driving frequency of about 240 Hz. Furthermore, various other equivalent circuits may be applied thereto. In an embodiment comprising the liquid crystal display shown in FIG. 1 to FIG. 3, a dynamic capacitance compensation ("DCC") type driving may be utilized in order to further enhance the response time of the liquid crystal. In DCC, the higher the voltage applied to both ends of the liquid crystal capacitor, the more rapid the charging speed. The data voltage applied to the relevant pixel, which may be the difference between the data voltage and the common voltage, but for convenience, the common voltage is assumed to be 0, increases so that it is higher than the target voltage, thus the time to charge the liquid crystal capacitor to the target voltage may decrease. In an embodiment, it may be desirable to provide a lookup table to record the desired parameters for correcting the image signal.

As shown in FIG. 1, a liquid crystal display according to an exemplary embodiment includes a liquid crystal panel assembly 300, a gate driver 400, a data driver 500, a gray voltage generator 800 and a signal controller 600.

When viewed from the equivalent circuit shown in FIG. 3, the liquid crystal panel assembly 300 includes a plurality of signal lines, the signal lines comprising first and second gate lines GLa and GLb, respectively, data lines DL, first and second storage electrode lines SLa and SLb, and a plurality of pixels PX electrically connected to those signal lines and arranged in the form of a matrix. By contrast, when viewed from the structure shown in FIG. 2, the liquid crystal panel assembly 300 includes lower and upper display panels 100 and 200 facing each other, and a liquid crystal layer 3 disposed between the lower and upper display panels 100 and 200.

Referring to FIG. 3, the signal lines include a plurality of first and second gate lines GLa and GLb, respectively for transmitting gate signals (also called "scanning signals"), a plurality of data lines DL for transmitting data voltages Vd and a plurality of first and second storage electrode lines SLa and SLb, respectively. The first and second gate lines GLa and GLb and the first and second storage electrode lines SLa and SLb are disposed roughly in the row direction and are substantially parallel to each other, and the data lines DL are disposed roughly in the column direction and are substantially parallel to each other.

The liquid crystal panel assembly according to an exemplary embodiment includes a plurality of signal lines, and a plurality of pixels PX electrically connected to the signal lines.

The respective pixels PX include a pair of sub-pixels, which in turn include first and second liquid crystal capacitors Clca and Clcb, respectively. The two sub-pixels include first and second gate lines GLa and GLb, a data line DL, and first, second and third switching elements Qa, Qb and Qc electrically connected to the first and second liquid crystal capacitors Clca and Clcb.

The first and second liquid crystal capacitors Clca and Clcb utilize first and second sub-pixel electrodes PEa and PEb of the lower panel 100 as a first terminal, respectively, and both the first and the second liquid crystal capacitors Clca and Clcb utilize a common electrode CE of the upper display panel 200 as a second terminal. The liquid crystal layer 3 is interposed between the first and second sub-pixel electrodes PEa and PEb and the common electrode CE functions as a dielectric. The pair of first and second sub-pixel electrodes PEa and PEb are separated from each other, and together form a pixel electrode PE. The common electrode CE is disposed on the entire surface of the upper display panel 200 so as to receive a common voltage Vcom. The liquid crystal layer 3 has a negative dielectric anisotropy, and liquid crystal molecules of the liquid crystal layer 3 may be, when an electric field is not applied thereto, aligned such that the directors thereof are standing vertical to the surface of the two display panels. The liquid crystal layer 3 may contain the previously-described liquid crystal composition. Differing from the embodiment of FIG. 2, the common electrode CE may be disposed on the lower panel 100, and in this embodiment, at least one of the pixel electrode PE and the common electrode CE may be disposed in the shape of a line or bar.

In another embodiment, wherein color images are displayed, the respective pixels PX uniquely display one of the primary colors (spatial division), or the respective pixels PX alternately display the primary colors in a temporal order (temporal division) so as to make the desired colors be recognized by the spatial and temporal sums of the primary colors. The primary colors may be the three colors red, green and blue. FIG. 2 illustrates a spatial division wherein a color filter CF for displaying one of the primary colors is provided on the upper display panel 200 per each pixel PX. Differing from the embodiment of FIG. 2, the color filter CF may be placed over or below the first and second sub-pixel electrodes PEa and PEb of the lower panel 100.

First and second polarizers 12 and 22 are provided on the outer surfaces of the lower and upper display panels 100 and 200 such that the polarization axes thereof may be perpendicular to each other. In an embodiment comprising a reflective liquid crystal display one of the first and second polarizers 12 and 22 may be omitted. In an embodiment wherein the polarizers are crossed polarizers, the light incident upon the liquid crystal layer 3 is interrupted when an electric field is not applied thereto.

Referring to FIG. 1 again, the gray voltage generator 800 generates all or a limited number of gray voltages, referred to hereinafter as reference gray voltages, which are related to the transmittance of the pixels PX. The reference gray voltages may include positive-valued and negative-valued voltages with respect to the common voltage Vcom.

The gate driver 400 is electrically connected to the first and second gate lines GLa and GLb of the liquid crystal panel assembly 300, and applies gate signals, which comprise combinations of a gate on voltage Von and a gate off voltage Voff, to the first and second gate lines GLa and GLb.

The data driver 500 is electrically connected to the data lines DL of the liquid crystal panel assembly 300, and selects gray voltages from the gray voltage generator 800 and applies them to the data lines DL as data voltages. However, in an embodiment wherein the gray voltage generator 800 provides not all of the gray voltages but limited number of reference gray voltages, the data driver 500 divides the reference gray voltages to thereby generate the desired data voltages.

The signal controller 600 controls the gate driver 400, the data driver 500, etc.

The driving units, comprising the gate driver 400, the data driver 500, the signal controller 600 and the gray voltage generator 800 are directly mounted on the liquid crystal panel assembly 300 in the form of at least one integrated circuit ("IC") chip, or attached to the liquid crystal panel assembly 300 in the form of a tape carrier package ("TCP") while mounted on a flexible printed circuit film (not shown). The driving units, comprising the gate driver 400, the data driver 500, the signal controller 600 and the gray voltage generator 800 may be mounted on a separate printed circuit board ("PCB", not shown). Alternatively, the driving units, comprising the gate driver 400, the data driver 500, the signal controller 600 and the gray voltage generator 800 may be integrated on the liquid crystal panel assembly 300 together with the first and second signal lines GLa and GLb, the data lines DL and the first, second and third thin film transistor switching elements Qa, Qb and Qc. Furthermore, the driving units, the comprising gate driver 400, the data driver 500, the signal controller 600 and the gray voltage generator 800 may be integrated in a single chip, and in this embodiment, at least one of the foregoing driving units or at least one circuit element thereof may be placed external to the single chip.

Referring to FIG. 3, a liquid crystal display according to an exemplary embodiment of includes signal lines, including first and second gate lines GLa and GLb neighboring each other, data lines DL and first and second storage electrode lines SLa and SLb, and a pixel PX electrically connected to the foregoing signal lines.

The pixel PX includes first, second and third switching elements Qa, Qb and Qc, first and second liquid crystal capacitors Clca and Clcb, first and second storage capacitors Csta and Cstb, a step-down capacitor Cstd, and a step-up capacitor Cstu.

The first and the second switching elements Qa and Qb are electrically connected to the first gate line GLa and the data line DL respectively, and the third switching element Qc is electrically connected to the second gate line GLb.

The first and the second switching elements Qa and Qb are three terminal elements of thin film transistors provided on the lower display panel 100. The control terminals of the first and the second switching elements Qa and Qb are electrically connected to the first gate line GLa, and the input terminals thereof are electrically connected to the data lines DL, while the output terminals thereof are electrically connected to the first and the second liquid crystal capacitors Clca and Clcb and the first and the second storage capacitors Csta and Cstb, respectively.

The third switching element Qc is also a three terminal element of a thin film transistor provided on the lower display panel 100. The control terminal of the third switching element Qc is electrically connected to the second gate line GLb, the input terminal is electrically connected to the second liquid crystal capacitor Clcb, and the output terminal thereof is connected to the step-down capacitor Cstd and the step-up capacitor Cstu.

The first and the second storage capacitors Csta and Cstb are electrically connected to the first and the second switching elements Qa and Qb, respectively, and the first and the second storage electrode lines SLa and SLb, respectively, and serve to assist the first and the second liquid crystal capacitors Clca and Clcb. The first and the second storage capacitors Csta and Cstb are formed by overlapping the first and second storage electrode lines SLa and SLb and the pixel electrode PE provided on the lower display panel 100 with each other with an insulator interposed therebetween, and a selected voltage, such as a storage voltage, is applied to the first and second storage electrode lines SLa and SLb.

The step-down capacitor Cstd is electrically connected to the output terminal of the third switching element Qc and the second storage electrode line SLb, and formed by overlapping the second storage electrode line SLa and the output electrode of the third switching element Qc provided on the lower display panel 100 with each other and interposing an insulator therebetween.

The step-up capacitor Cstu is electrically connected to the output terminal of the third switching element Qc and the second liquid crystal capacitor Clcb, and is formed by overlapping the second sub-pixel electrode PEb and the output electrode of the third switching element Qc provided on the lower display panel 100 with each other and interposing an insulator therebetween. The step-up capacitor Cstu has a capacitance, which is less than a capacitance of the step-down capacitor Cstd.

The liquid crystal panel assembly shown in FIG. 1 to FIG. 3 will be now described in further detail with reference to FIG. 4 to FIG. 6.

Figure 4:
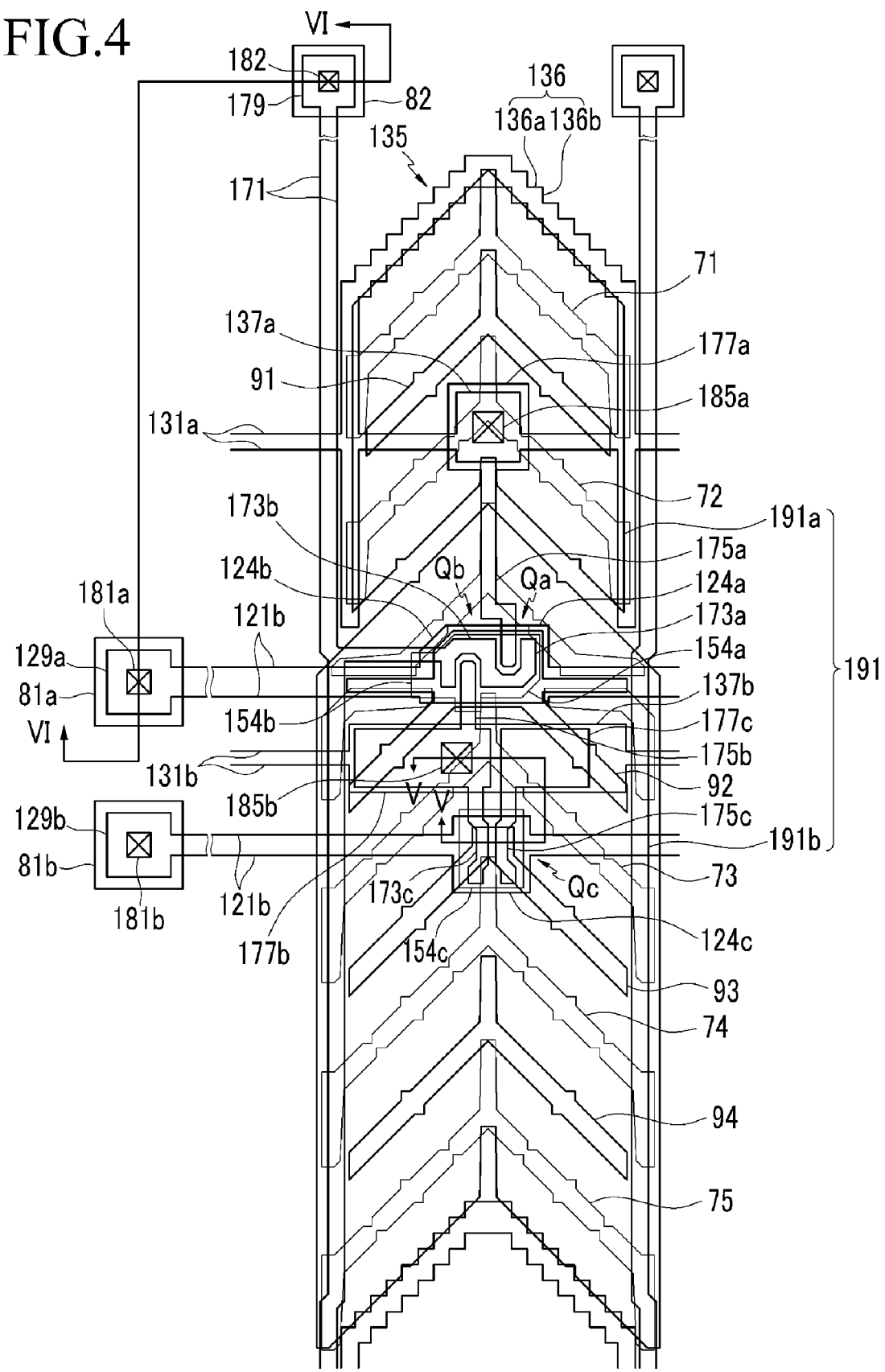
FIG. 4 is a plan view of an exemplary embodiment of a liquid crystal display.
Figure 5:
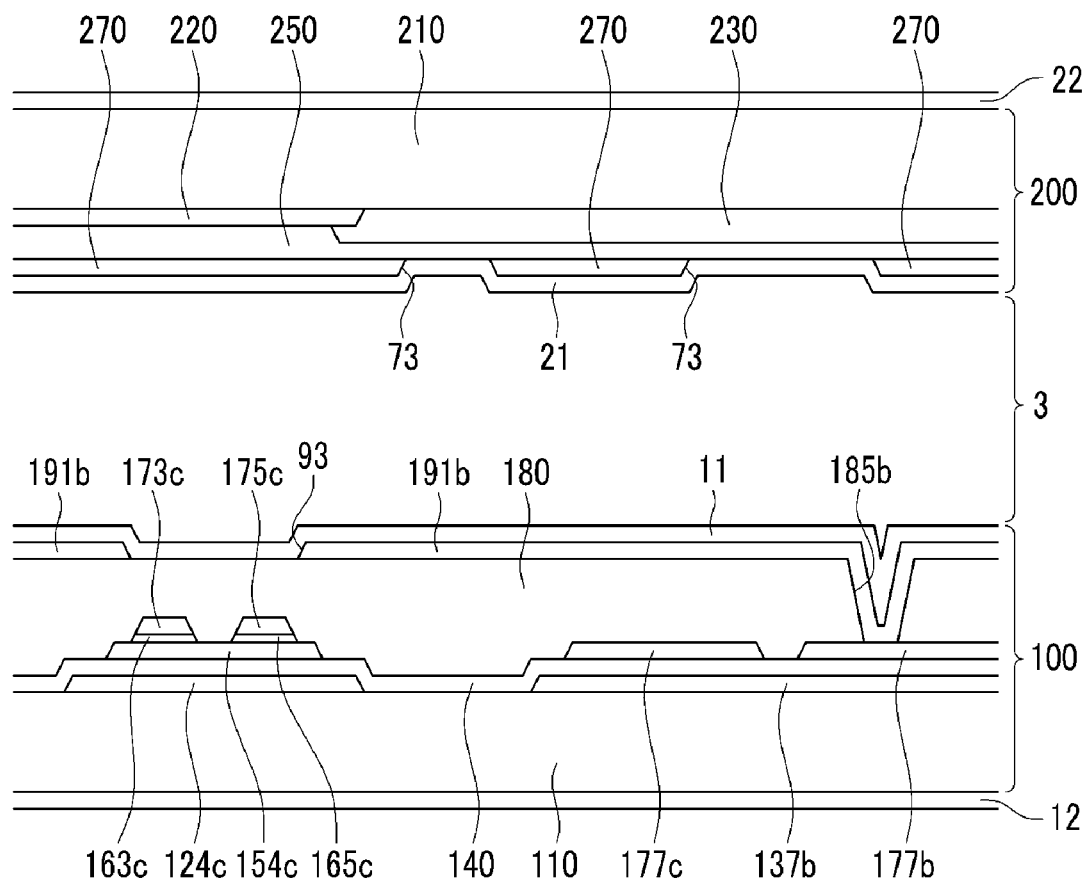
FIG. 5 and FIG. 6 are cross-sectional views of the liquid crystal display shown in FIG. 4, taken along line VI-VI and line VII-VII thereof, respectively.
Figure 6:
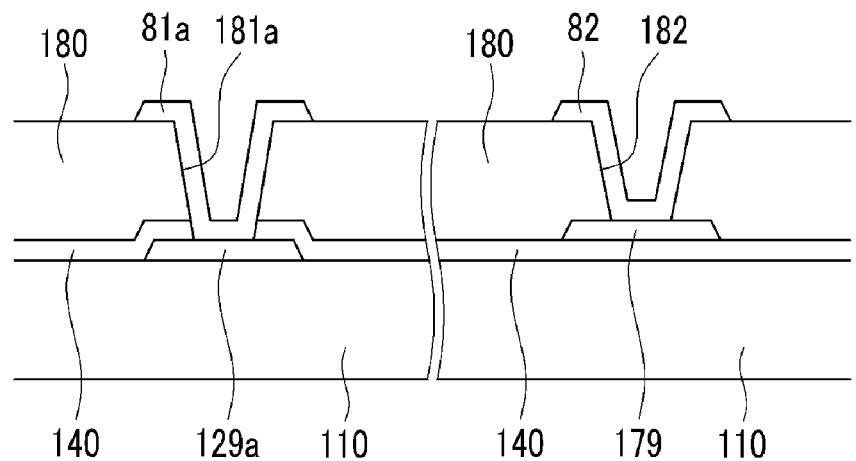

FIG. 4 is a plan view of an exemplary embodiment of a liquid crystal display, and FIG. 5 and FIG. 6 are cross-sectional views of the liquid crystal display shown in FIG. 4 taken along line VI-VI and line VII-VII.

The liquid crystal display shown in FIG. 4 to FIG. 6 may have a driving frequency of about 240 Hz. The liquid crystal display having the driving frequency of about 240 Hz may be provided with micro slit-shaped pixel electrodes. Furthermore, the driving frequency of about 240 Hz may be applied to liquid crystal displays with various configurations.

In an embodiment, the liquid crystal display includes lower and upper display panels 100 and 200, a liquid crystal layer 3 sandwiched between the two lower and upper display panels 100 and 200 and first and second polarizers 12 and 22 attached to the outer surfaces of the lower and upper display panels 100 and 200. The liquid crystal layer 3 may contain the liquid crystal composition disclosed above.

The lower display panel 100 will be further described.

A plurality of gate conductors with a plurality of pairs of first and second gate lines 121a and 121b and a plurality of pairs of first and second storage electrode lines 131a and 131b are disposed on a first insulating substrate 110. The first gate line 121a has first and second gate electrodes 124a and 124b and a first gate end portion 129a, and the second gate line 121b has a third gate electrode 124c and a second gate end portion 129b.

The first storage electrode line 131a has a first storage electrode 137a extending upward and downward with respect to first storage line 131a, and stem line portions extended vertically relative to the first and second gate lines 121a and 121b. Furthermore, the first storage electrode line 131a has a light interception member 135 extending from the stem line portions and obliquely angled to the first and second gate lines 121a and 121b.

The second storage electrode line 131b has a second storage electrode 137b protruding upward and downward relative to second storage electrode line 131b.

A gate insulating layer 140 is disposed on the gate conductors, including first and second gate lines 121a and 121b and first and second storage lines 131a and 131b. First, second and third semiconductor islands 154a, 154b and 154c are disposed on the gate insulating layer 140, and overlaid with a plurality of first ohmic contacts (not shown), second ohmic contacts (not shown) and third primary and secondary ohmic contacts 163c and 165c.

Data conductors with a plurality of data lines 171 and a plurality of first, second and third drain electrodes 175a, 175b and 175c are disposed on the first primary and secondary ohmic contacts 163c and 165c and the gate insulating layer 140.

The data line 171 has a plurality of first and second source electrodes 173a and 173b, and a data wide end portion 179, which may be electrically connected with other layers or external driving circuits.

The first to the third drain electrodes 175a, 175b and 175c have first, second and third wide end, portions 177a, 177b and 177c at one side thereof, and bar-shaped end portions at the other side thereof. The first and second wide end portions 177a and 177b of the first and the second drain electrodes 175a and 175b are overlapped with the first and the second storage electrodes 137a and 137b, and the bar-shaped end portions thereof are partially surrounded by the first and the second source electrodes 173a and 173b. The wide end portion 177b of the second drain electrode 175b extends so as to form a bar-shaped third source electrode 173c. The third wide end portion 177c of the third drain electrode 175c is overlapped with the second storage electrode 137b, and the bar-shaped end portion thereof faces the third source electrode 173c.

The first, the second and the third gate electrodes 124a, 124b and 124c, the first, the second and the third source electrodes 173a, 173b and 173c and the first, the second and the third drain electrodes 175a, 175b and 175c form first, second and third thin film transistors ("TFTs") Qa, Qb and Qc together with the first, the second and the third semiconductor islands 154a, 154b and 154c, and the channels of the thin film transistors are disposed at the first to third semiconductor islands 154a, 154b and 154c between the first to third source electrodes 173a, 173b and 173c and the first to third drain electrodes 175a, 175b and 175c, respectively.

A passivation layer 180 is disposed on the data conductors, including data lines 171 and first to third drain electrodes 175a, 175b and 175c, and the exposed portions of the semiconductors, including first to third semiconductor islands 154a, 154b and 154c.

The passivation layer 180 has a plurality of contact holes, including third, fourth and fifth contact holes 182, 185a and 185b exposing the end of data wide end portion 179 of the data line 171, the first wide end portion 177a of the first drain electrode 175a and the second wide end portion 177b of the second drain electrode 175b, respectively. The passivation layer 180 and the gate insulating layer 140 may have a plurality of contact holes, including first and second contact holes 181a and 181b exposing first and second gate end portions 129a and 129b of the first and second gate lines 121a and 121b, respectively.

The passivation layer 180 is overlaid with a pixel electrode 191 having first and second sub-pixel electrodes 191a and 191b, and a plurality of contact assistants, including first to third contact assistants 81a, 81b and 82.

The first sub-pixel electrode 191a has first and second vertical edges 192a and 192b facing each other, and two pairs of first to fourth primary oblique edges 192c, 192d, 192e and 192f neighboring to the first and second vertical edges 192a and 192b. The second sub-pixel electrode 191b also has a pair of vertical edges, third and fourth vertical edges 193a and 193b, which face each other, and two pairs of oblique edges, first to fourth secondary oblique edges 193c, 193d, 193e and 193f neighboring the third and fourth vertical edges 193a and 193b. The respective first to fourth vertical edges 192a, 192b, 193a and 193b are disposed parallel to the data line 171, and the respective first to fourth primary oblique edges 192c to 192f and 193c to 193f are obliquely angled to the first to fourth vertical edges 192a, 192b, 193a and 193b by about 45° or about 135°. The first and the second primary oblique edges 192c and 192d, and the first and second secondary oblique edges 193c and 193d meet each other at substantially a right angle, and the third and the fourth primary oblique edges 192e and 192f, and the third and fourth secondary oblique edges 193e and 193f meet each other at substantially a right angle.

The first and the second sub-pixel electrodes 191a and 191b are adjacent to each other in the column direction, and the first sub-pixel electrode 191a has a height, which is less than a height of the second sub-pixel electrode 191b.

The first sub-pixel electrode 191a has a first secondary cutout 91, and the second sub-pixel electrode 191b also has cutouts, specifically second to fourth secondary cutouts 92, 93 and 94.

First to fourth secondary cutouts 91, 92, 93 and 94 of the first and the second sub-pixel electrodes 191a and 191b are angled towards the first and second gate lines 121a and 121b by about 45°. The pixel electrode 191 is partitioned into several domains by way of the cutouts. The number of domains or cutouts may be selected depending upon the design factors such as a pixel size, the length ratio of the horizontal to the vertical edges of the pixel electrode, and the kind or characteristic of the liquid crystal layer 3.

The first and the second sub-pixel electrodes 191a and 191b are physico-electrically connected to the first and the second drain electrodes 175a and 175b through the fourth and fifth contact holes 185a and 185b to receive data voltages therefrom. Furthermore, the second sub-pixel electrode 191b is physico-electrically connected to the third source electrode 173c through the fifth contact hole 185b. Because the second sub-pixel electrode 191b is electrically connected to the second and the third drain electrodes 175b and 175c through the fifth contact hole 185b, it is desirable for it to have two contact holes, such as second and third 185a and 185b, per pixel. Accordingly, the aperture ratio may increase compared to the case where the second sub-pixel electrode 191b is electrically connected to the second and the third drain electrodes 175b and 175c through two different contact holes, respectively.

The first and the second sub-pixel electrodes 191a and 191b generate electric fields in association with the common electrode 270 of the upper display panel 200. Accordingly, the alignment direction of the liquid crystal molecules of the liquid crystal layer 3 between the pixel electrode 191 and the common electrode 270 is selected. The polarization of the light passing through the liquid crystal layer 3 is differentiated depending upon the selected alignment direction of the liquid crystal molecules. The pixel electrode 191 and the common electrode 270 form a liquid crystal capacitor, which may store the voltage applied thereto even after the thin film transistor turns off.

The first and the second sub-pixel electrodes 191a and 191b are overlapped with the first and second storage electrode lines 131a and 131b, including the first and the second storage electrodes 137a and 137b. The pixel electrode 191 is overlapped with the first and second storage electrode lines 131a and 131b so as to form a storage capacitor, which may improve the voltage storage capacity of the liquid crystal capacitor.

The second storage electrode 137b and the third wide end portion 177c of the third drain electrode 175c are overlapped with each other by interposing a gate insulating layer 140 therebetween so as to form a step-down capacitor Cstd, and the third wide end portion 177c of the third drain electrode 175c and the second sub-pixel electrode 191b are overlapped with each other by interposing a passivation layer 180 therebetween so as to form a step-up capacitor Cstu. As the passivation layer 180 has a thickness, which is greater than a thickness of the gate insulating layer 140, the step-down capacitor Cstd is greater in capacitance than the step-up capacitor Cstu.

As further described above, with a liquid crystal display according to an exemplary embodiment, the step-down capacitor Cstd and the step-up capacitor Cstu are formed using the second storage electrode 137b without separately forming a new storage electrode so that the aperture ratio may increase, compared to the embodiment wherein such a new storage electrode is separately provided to form the step-down capacitor Cstd and the step-up capacitor Cstu.

The first to third contact assistants 81a, 81b and 82 are electrically connected to the first and second gate end portions 129a and 129b of the first and second gate lines 121a and 121b and the data wide end portion 179 of the data line 171 through the first to third contact holes 181a, 181b and 182, respectively. The first to third contact assistants 81a, 81b and 82 may assist the adhesion of the first and second gate end portions 129a and 129b of the first and second gate lines 121a and 121b and the data wide end portion 179 of the data line 171 to external devices, and may protect them.

A first alignment layer 11 is disposed on the pixel electrode 191, the first to third contact assistants 81a, 81b and 82, and the passivation layer 180.

The upper display panel 200 will now be described in further detail.

A light blocking member 220 is disposed on a second insulating substrate 210. The light blocking member 220, also called a black matrix, substantially prevents or effectively eliminates the leakage of light.

A plurality of color filters 230 are disposed on the second insulating substrate 210. The color filters 230 are generally are within the area surrounded by the light blocking member 220, and may extend longitudinally along the columns of pixel electrodes 191 in the vertical direction. The respective color filters 230 may express one of three primary colors of red, green and blue.

An overcoat 250 is disposed on the color filters 230 and the light blocking member 220.

A common electrode 270 is disposed on the overcoat 250. A plurality of sets of cutouts, first to fifth primary cutouts 71, 72, 73, 74 and 75 are disposed at the common electrode 270. The respective first to fifth primary cutouts 71 to 75 have at least one oblique portion disposed parallel to the first to fourth secondary cutouts 91 to 94 of the pixel electrode 191. Triangle-shaped notches are disposed at the oblique portions of the first to fifth primary cutouts 71 to 75 of the common electrode 270 and the first to fourth secondary cutouts 91 to 94 of the pixel electrode 191. Branches are disposed at the ends of the oblique portions of the first to fifth primary cutouts 71 to 75 of the common electrode 270 such that they are disposed roughly parallel to the data lines.

First and second alignment layers 11 and 21 are disposed on the inner surfaces of the lower and upper display panels 100 and 200, respectively.

The liquid crystal layer 3 has a negative dielectric anisotropy, and liquid crystal molecules of the liquid crystal layer 3 are aligned such that the directors thereof are standing vertical to the surface of the lower and upper display panels 100 and 200. The liquid crystal layer 3 may contain the previously-described liquid crystal composition.

When the first and second liquid crystal capacitors Clca and Clcb are charged, an electric field is generated substantially vertical to the surface of the lower and upper display panels 100 and 200. In response to the electric field, the liquid crystal molecules are inclined to be oriented such that the directors thereof are standing, vertical to the direction of the electric field.

Meanwhile, the first to fourth secondary cutouts 91 to 94 and first to fifth primary 71 to 75 of the pixel and the common electrodes 191 and 270 being the field generating electrodes, and the oblique edges of the pixel electrode 191 proceeding parallel thereto deform the electric fields, and make formation of horizontal components for determining the inclination direction of the liquid crystal molecules. The horizontal components of the electric field are standing vertical to the oblique edges of the first to fourth secondary cutouts 91 to 94 and first to fifth primary cutouts 71 to 75, and the oblique edges of the pixel electrode 191.

The set of common electrode cutouts, first to fifth primary cutouts 71 to 75 and the set of pixel electrode cutouts, first to fourth secondary cutouts 91 to 94 partition the pixel electrode 191 into a plurality of domains, each of which has two major edges obliquely angled to the major edges of the pixel electrode 191. The liquid crystal molecules over the respective pixel electrode domains are generally inclined in a direction vertical to the major edges thereof, and hence, roughly four inclination directions are made. As the inclination directions of the liquid crystal molecules are diversified, the reference viewing angle of the liquid crystal display may increase.

Meanwhile, a light interception member 135 is disposed along the first and the second primary-oblique edges 192c and 192d of the first sub-pixel electrode 191a, and the third and the fourth secondary oblique edges 193e and 193f of the second sub-pixel electrode 191b. The light interception member 135 has a plurality of steps 136 with horizontal and vertical portions 136a and 136b. The horizontal portion 136a is disposed parallel to the first and second gate lines 121a and 121b, and the vertical portion 136b is disposed parallel to the data line 171. As the polarization axis of the first and second polarizers 12 and 22 is angled toward the first to fourth primary oblique edges 192c to 192f and the first to fourth secondary oblique edges 193c to 193f by about 45° or about 135°, leakage of light may occur around the first to fourth primary oblique edges 192c to 192f and the first to fourth secondary oblique edges 193c to 193f. In an embodiment wherein the light interception member 135, which has steps 136, each with horizontal and vertical portions 136a and 136b standing parallel to the polarization axis of the first and second polarizers 12 and 22, is disposed at the first and the second primary oblique edges 192c and 192d of the first sub-pixel electrode 191a and the third and the fourth secondary oblique edges 193e and 193f of the second sub-pixel electrode 191b, the possible leakage of light at the borderline area between neighboring pixel electrodes 191 may be substantially prevented or effectively eliminated.

The horizontal and the vertical portions 136a and 136b of the step 136 may be identical in length with each other. The horizontal and the vertical portions 136a and 136b of the step 136 may have a length of about 4 micrometers (μm) to about 24 μm, specifically about 8 μm to about 12 μm respectively, more specifically about 10 μm, which is desirable for preventing the leakage of light.

A liquid crystal display according to an exemplary embodiment will be now described in further detail with reference to FIG. 7. The repeated description as to the liquid crystal display shown in FIG. 1 to FIG. 6 and the liquid crystal composition will be omitted for clarity.

Figure 7:
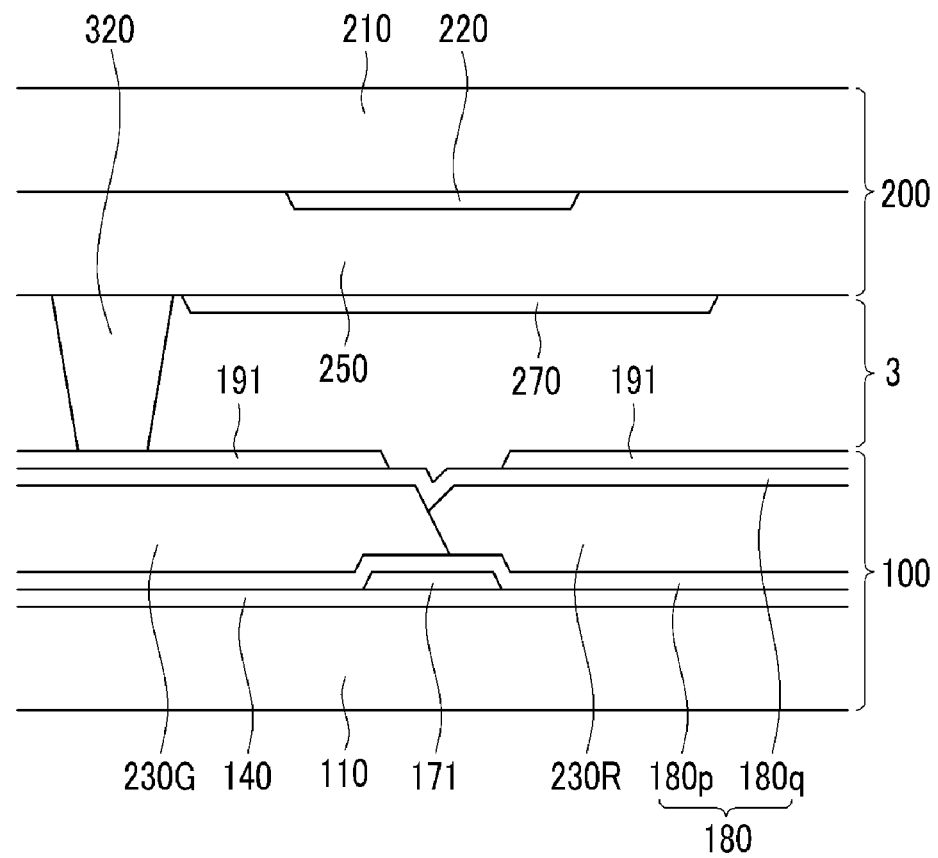
FIG. 7 is a cross-sectional view of another exemplary embodiment of a liquid crystal display.

FIG. 7 is a cross-sectional view of another exemplary embodiment of a liquid crystal display.

The structure of the liquid crystal display shown in FIG. 7 may be the same as that related to FIG. 1 to FIG. 6 except that red and green color filters 230R and 230G are disposed on the first display panel 100. The light blocking member 220 is roughly disposed between the red and the green color filters 230R and 230G. The passivation layer 180 has a lower layer 180p placed under the red and green color filters 230R and 230G, and an upper layer 180q placed over the red and green color filters 230R and 230G. The lower and the upper layers 180p and 180q each may contain an inorganic insulating material or an organic insulating material. The previously-described liquid crystal composition may be used to form the liquid crystal layer 3, and in this embodiment, it is observed that linear afterimages may not be generated during about 2,000 hours, specifically about 1,000 hours, more specifically about 500 hours.

The exemplary embodiments will be further described by way of Examples, which do not limit or define the scope or range of the embodiments, but exemplify the embodiments.

EXAMPLES

Example 1

A liquid crystal composition is prepared with about 10.5 weight percent (wt %) of the compound represented by the Formula 1, about 28.5 wt % of the compound represented by the Formula 2, about 8 wt % of the compound represented by the Formula 4, about 6.5 wt % of the compound represented by the Formula 5, about 15 wt % of the compound represented by the Formula 6, about 8 wt % of the compound represented by the Formula 7, about 12 wt % of the compound represented by the Formula 8, and about 11.5 wt % of the compound represented by the Formula 9. In the compound represented by Formula 1, A is:

X is F, $R_1$ is a methyl group and $R_2$ is an ethoxy group. In the compound represented by Formula 2, $R_3$ is a propyl group, and $R_4$ is a butyl group. In Formula 4, $R_7$ is a methyl group, and $R_8$ is an ethoxy group. In the Formula 5, $R_9$ is a methyl group, and $R_{10}$ is an ethyl group. In Formula 6, X is F, $R_{11}$ is a methyl group and $R_{12}$ is an ethoxy group. In Formula 7, X is F, $R_{13}$ is a methyl group and $R_{14}$ is an ethoxy group. In Formula 8, X is F, $R_{15}$ is a methyl group and $R_{16}$ is an ethoxy group. In Formula 9, X is F, $R_{15}$ is a methyl group and $R_{16}$ is an ethyl group.

The liquid crystal display shown in FIG. 1 to FIG. 6 is fabricated by using the foregoing liquid crystal composition as a material for the liquid crystal layer. The driving frequency of the liquid crystal display is 240 Hz, and the cell gap thereof is 3.2 μm.

Comparative Example 1

A liquid crystal composition is prepared with about 3 wt % of the compound represented by the Formula 4, about 13 wt % of the compound represented by the Formula 5, about 9 wt % of the compound represented by the Formula 5, about 12 wt % of the compound represented by Formula 10, about 20 wt % of the compound represented by the Formula 6, about 18 wt % of the compound represented by the Formula 7, about 20 wt % of the compound represented by the Formula 8, and about 5 wt % of the compound represented by Formula 11. In the compound represented by the Formula 4, $R_7$ is a methyl group, and $R_8$ is an ethoxy group. In the comparative example prepared with 13 wt % of the compound represented by the Formula 5, $R_9$ is a methyl group, and $R_{10}$ is an ethyl group. In the comparative example prepared with of 9 wt % of the compound represented by the Formula 5, $R_9$ is a methyl group, and $R_{10}$ is an ethoxy group. In the compound represented by the Formula 6, X is F, $R_{11}$ is a methyl group and $R_{12}$ is an ethoxy group. In the compound represented by the Formula 7, X is F, $R_{13}$ is a methyl group and $R_{14}$ is an ethoxy group. In the compound represented by the Formula 8, X is F, $R_{15}$ is a methyl group and $R_{16}$ is an ethoxy group.

The liquid crystal display shown in FIG. 1 to FIG. 6 is fabricated by using the foregoing liquid crystal composition as a material for the liquid crystal layer. The driving frequency of the liquid crystal display is 240 Hz, and the cell gap thereof is 3.55 μm.

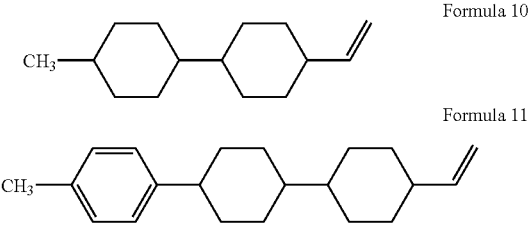

Formula 10

Formula 11

Measurements of Physical Properties of Liquid Crystal

The physical properties of the liquid crystal compositions prepared according to the Example 1 and the Comparative Example 1 are measured at 20° C.

With the liquid crystal composition according to the Example 1, the refractive anisotropy Δn (589 nm) is 0.102, the dielectric anisotropy Δε is −3.0, the rotational viscosity is 115 mPa·s, the phase transition temperature Tni is 75° C. and the elastic constant ratio of K11/K33 is equal to or greater than 13.6/equal to or greater than 13.8.

In the liquid crystal composition according to the Comparative Example 1, the refractive anisotropy Δn (589 nm) is 0.090, the dielectric anisotropy Δε is −3.4, the rotational viscosity is 125 mPa·s, the phase transition temperature Tni is 75° C. and the elastic constant ratio of K11/K33 is 13.5/14.1.

Measurement of Response Time

Figure 8:
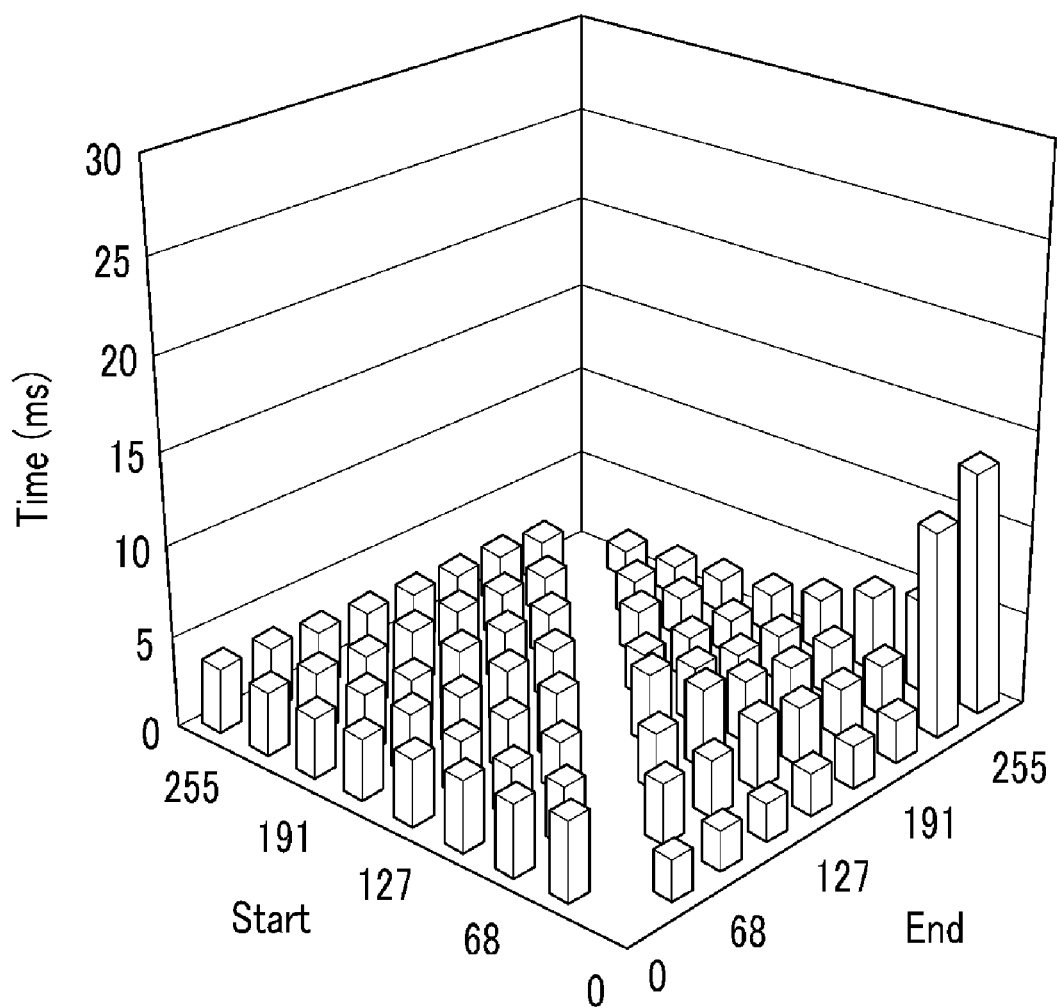
FIG. 8 and FIG. 9 are graphs illustrating the results of measuring the response time of an exemplary embodiment of a liquid crystal display according to Example 1 and a liquid crystal display according to Comparative Example 1.
Figure 9:
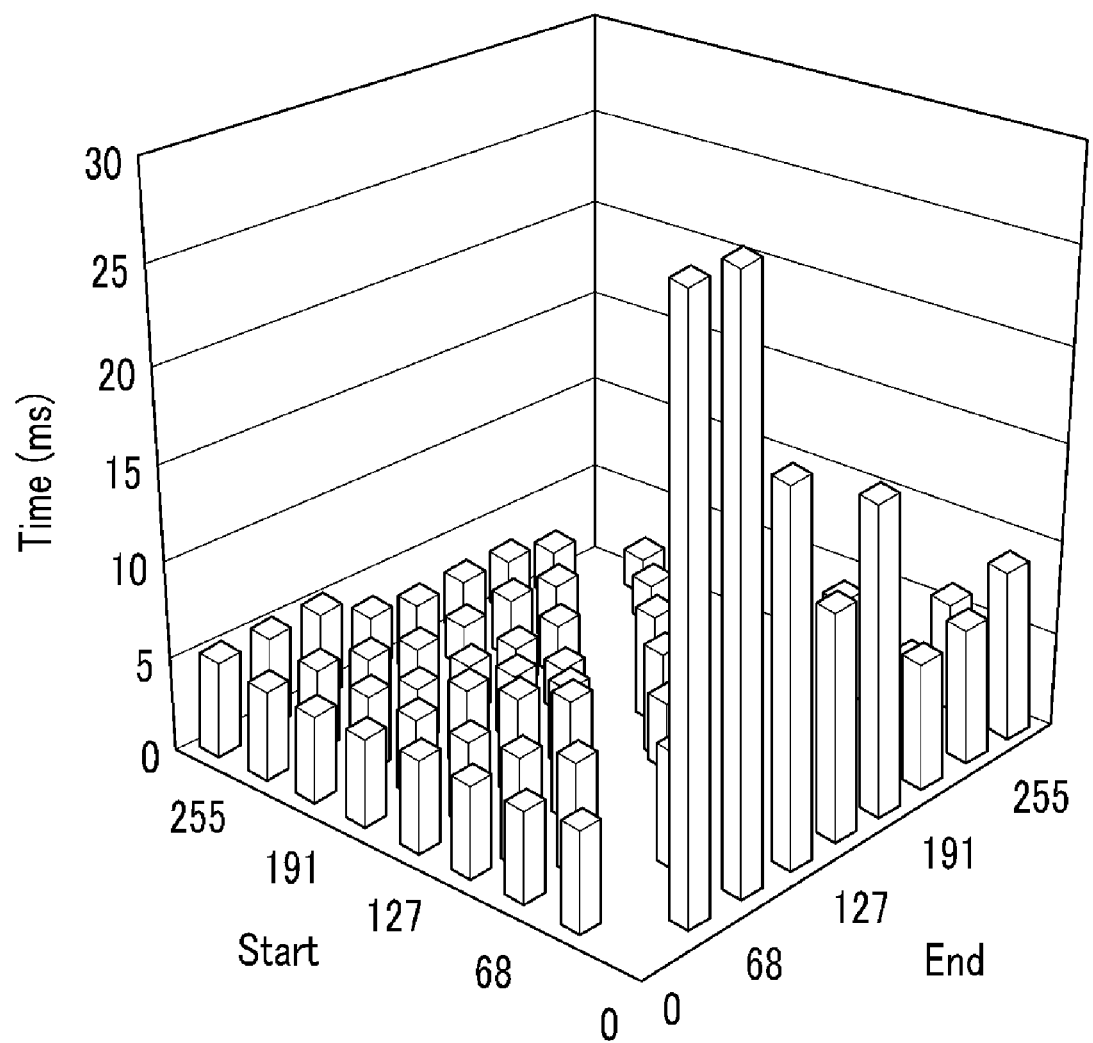

The liquid crystal displays fabricated according to Example 1 and Comparative Example 1 are measured for response time, and the measurement results are illustrated in the graphs of FIG. 8 and FIG. 9, respectively. As is shown in the right bottom ends of the graphs, the G-G response time with the embodiment of Example 1 is about 3.1 milliseconds (ms), and the G-G response time with the embodiment of Comparative Example 1 is about 5.0 ms. Accordingly, it can be observed that the response time decreases in an embodiment wherein the compounds represented by Formulas 1 and 2 are used instead of the neutral compound containing an alkenyl group according to Comparative Example 1.

Measurement of Motion Picture Defects

Figure 10:
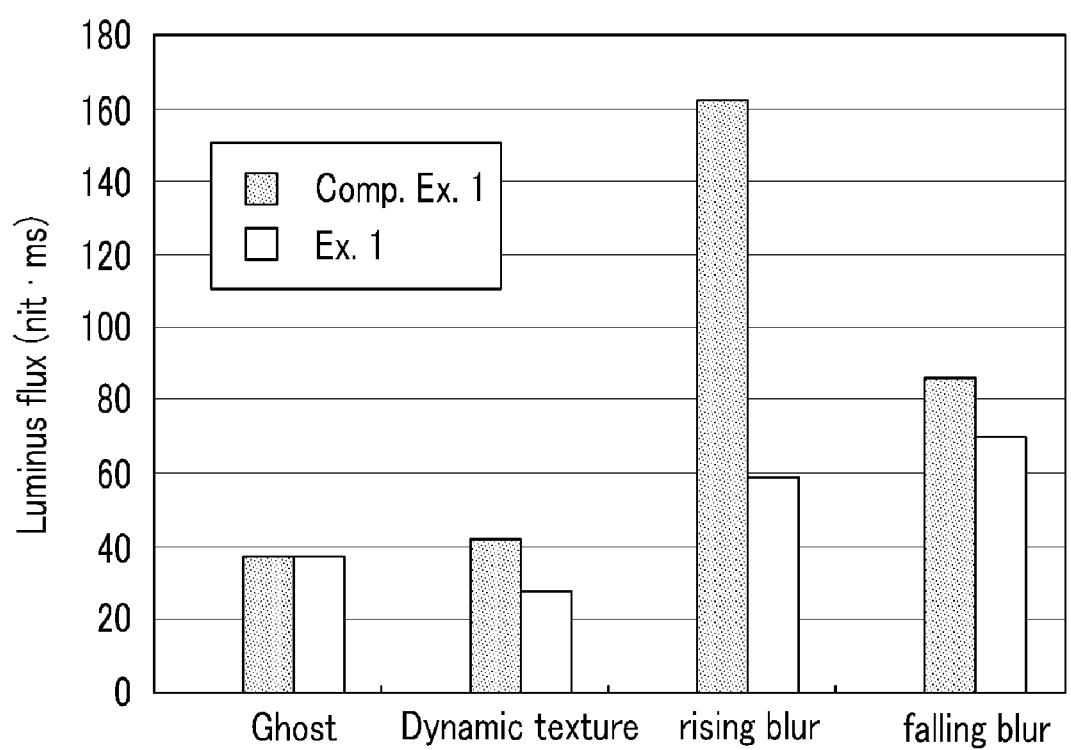
FIG. 10 is a graph illustrating the results of measuring the motion picture defects of the liquid crystal displays according to Example 1 and Comparative Example 1.

The motion picture defects of the liquid crystal displays fabricated according to Example 1 and Comparative Example 1 are measured, and the measurement results are illustrated in FIG. 10. The value of the y axis in the graph of FIG. 10 is obtained by multiplying the luminance with time, and the higher the value, the greater are the motion picture defects.

The method of measuring the respective motion picture defects will be described with reference to the graphs of FIG. 11 to FIG. 14.

Figure 11:
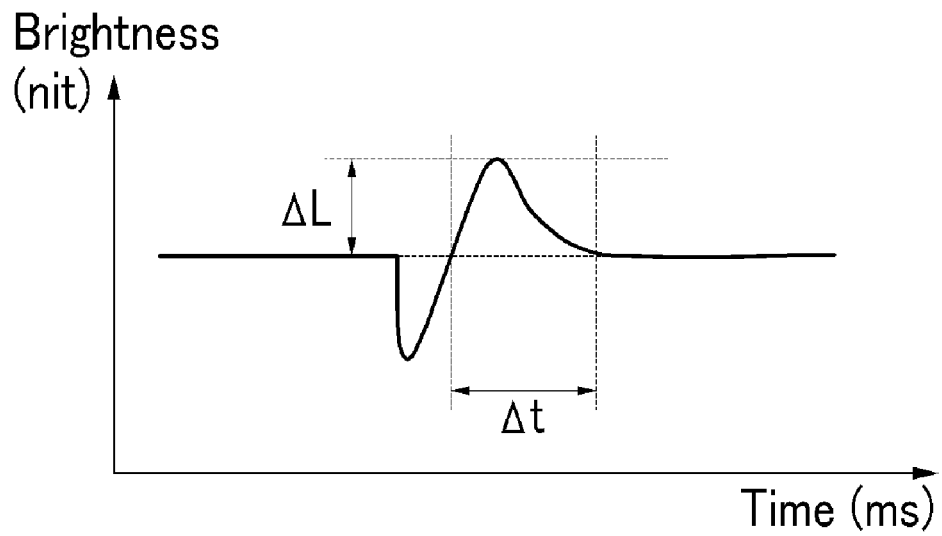
FIG. 11 to FIG. 14 are graphs for measuring ghosts, dynamic textures, rising blur and falling blur, respectively.

FIG. 11 is a graph illustrating a method for measuring the ghost, and the multiplication of the value of ΔL by the value of Δt is measured with the liquid crystal displays according to the Example 1 and the Comparative Example 1, respectively. The ghost may be usually generated under the application of an overshot voltage.

Figure 12:
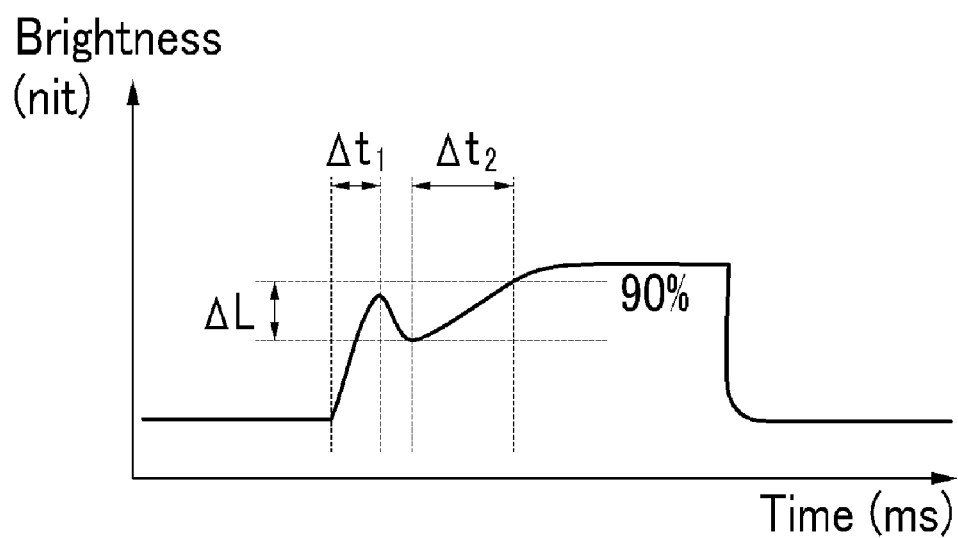

FIG. 12 is a graph for measuring the dynamic texture, and the multiplication of the value of ΔL by the value of Δt1+Δt2 is measured with the liquid crystal displays according to Example 1 and Comparative Example 1, respectively. The dynamic texture is related to tail blur, and may be generated simultaneously with bounce blur. Furthermore, in an embodiment wherein the overshot is extreme, the tail blur may be worse. It can be observed from the graph of FIG. 10 that tail blur is reduced when the liquid crystal composition according to Example 1 is used.

Figure 13:
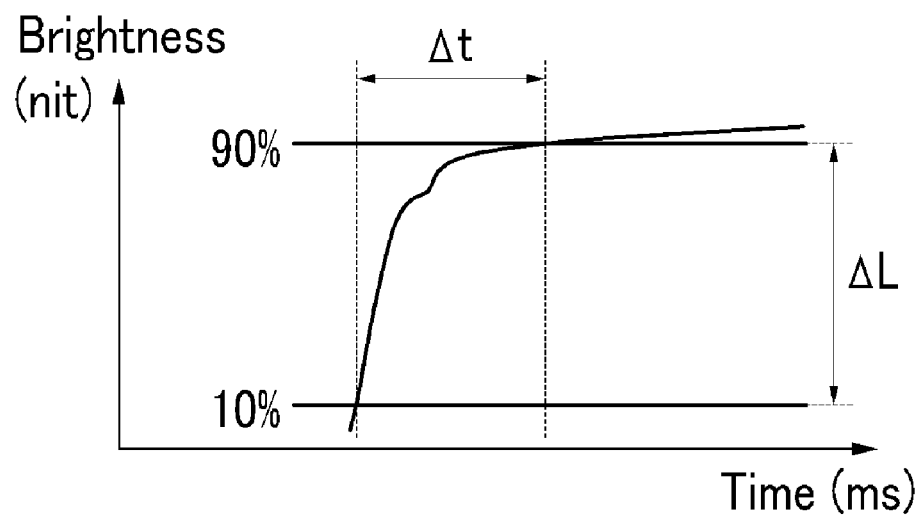

FIG. 13 is a graph for measuring rising blur, and the multiplication of the value of ΔL by the value of Δt is measured with the liquid crystal displays according to the Example 1 and the Comparative Example 1, respectively. The rising blur may be usually generated when overshot is not applied to the target, or applied little thereto. Furthermore, the rising blur may influence the dynamic contrast ratio. It can be observed from the graph of FIG. 10 that when the liquid crystal composition according to the Example 1 is used, the rising blur is only slightly generated, and hence, the dynamic contrast ratio is improved significantly.

Figure 14:
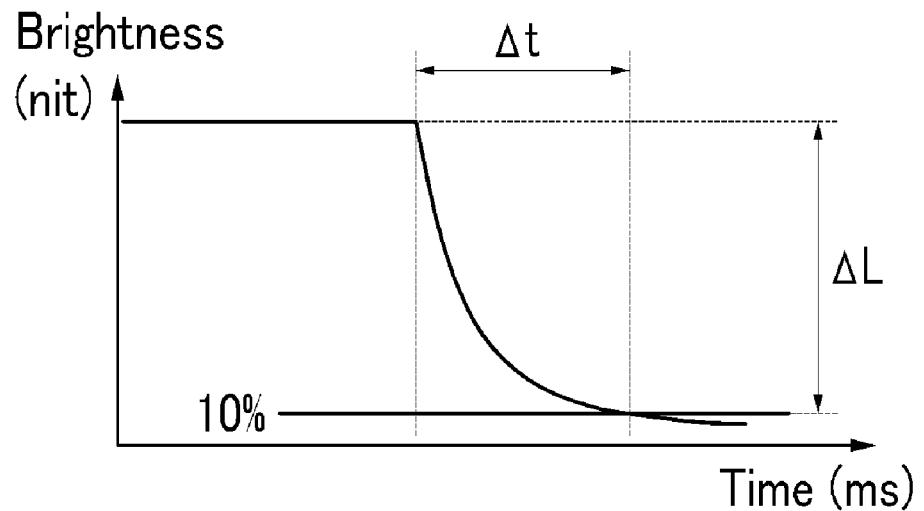

FIG. 14 is a graph for measuring the falling blur, and the multiplication of the value of ΔL by the value of Δt is measured with the liquid crystal displays according to the Example 1 and the Comparative Example 1, respectively. The falling blur is related to the white blur. It can be observed from the graph of FIG. 10 that when the liquid crystal composition according to the Example 1 is used, the falling blur is reduced.

Measurements of Surface Afterimages and Linear Afterimages

Figure 15:
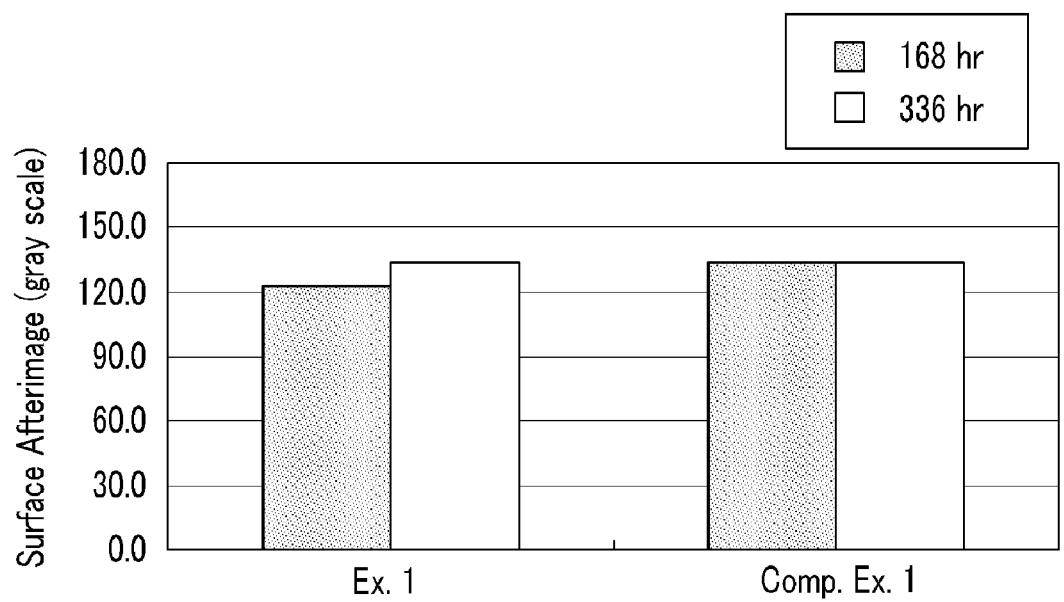
FIG. 15 is a graph illustrating the results of measuring the surface afterimages of the liquid crystal displays according to Example 1 and Comparative Example 1.

The liquid crystal displays according to the Example 1 and the Comparative Example 1 are measured in the degree of surface afterimages, and the measurement results are illustrated in the graph of FIG. 15.

It can be observed from the graph of FIG. 15 that the surface afterimages with the Example 1 and the Comparative Example 1 are similar to each other in the degree of generation under the time condition of 168 hours or 336 hours. Accordingly, it is observed that with the use of the liquid crystal composition according to the Example 1 that the surface afterimages are only slightly generated even though the cell gap is relatively small.

Furthermore, the linear afterimages with the case of Comparative Example 1 are generated at 60° C. within the time period of 500 hours, whereas the linear afterimages with Example 1 are not generated for 1,300 hours. Accordingly, with the usage of the liquid crystal composition according to the Example 1, it can be observed that the linear afterimages are reduced significantly, even though the cell gap is relatively small.

While this these embodiments have been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate;
a second substrate facing the first substrate;
a pixel electrode disposed on the first substrate, the pixel electrode comprising a first sub-pixel electrode and a second sub-pixel electrode;

a first thin film transistor comprising a first gate electrode, a first source electrode and a first drain electrode electrically connected to the first sub-pixel electrode, and the first gate electrode configured to receive a first gate signal;

a second thin film transistor comprising a second gate electrode, a second source electrode and a second drain electrode electrically connected to the second sub-pixel electrode, and the second gate electrode configured to receive the first gate signal;

a third thin film transistor comprising a third gate electrode, a third drain electrode and a third source electrode electrically connected to the second sub-pixel electrode, and the third gate electrode configured to receive a second gate signal; and a liquid crystal layer disposed between the first and the second substrates;

wherein the liquid crystal layer comprises a liquid crystal composition comprising a polar compound, the polar compound comprising a compound represented by Formula 1:

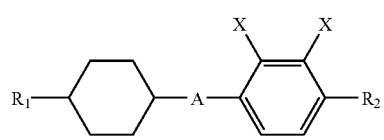

Formula 1 wherein A represents

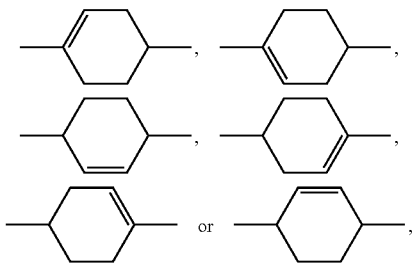

X represents a halogen, $R_1$ represents a substituted or unsubstituted $C_1$-$C_{10}$ alkyl group or a substituted or unsubstituted $C_1$-$C_{10}$ alkoxy group and $R_2$ represents a $C_1$-$C_5$ alkyl group or a $C_1$-$C_5$ alkoxy group.

2. The liquid crystal display of claim 1, wherein the liquid crystal composition further comprises a neutral compound, the neutral compound comprising a compound represented by Formula 2:

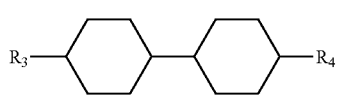

Formula 2 wherein each of $R_3$ and $R_4$ independently represents a $C_1$-$C_5$ alkyl group, a compound represented by Formula 3:

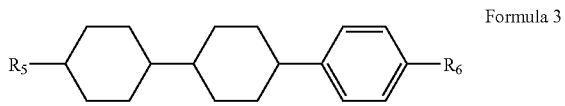

Formula 3 wherein each of $R_5$ and $R_6$ independently represents a $C_1$-$C_5$ alkyl group, or a mixture thereof 3. The liquid crystal display of claim 2, wherein the content of the compound represented by the Formula 1 is about 5 weight percent to about 15 weight percent, and the content of the compound represented by the Formula 2, the content of the compound represented by the Formula 3 or the content of the mixture thereof is about 20 weight percent to about 30 weight percent, based on the total weight of the liquid crystal composition.

4. The liquid crystal display of claim 2, wherein the liquid crystal display has a driving frequency of about 240 hertz.

5. The liquid crystal display of claim 2, wherein the liquid crystal layer has a thickness of about 3.1 micrometers to about 3.3 micrometers.

6. The liquid crystal display of claim 5, wherein the liquid crystal composition has a refractive anisotropy of about 0.100 to about 0.103.

7. The liquid crystal display of claim 6, wherein the liquid crystal composition has a dielectric anisotropy of about −3.2 to about −2.7.

8. The liquid crystal display of claim 2, wherein the liquid crystal composition has a rotational viscosity of about 90 millipascal seconds to about 125 millipascal seconds.

9. The liquid crystal display of claim 2, wherein the liquid crystal composition has a phase transition temperature of about 72° C. to about 80° C.

10. The liquid crystal display of claim 2, wherein the neutral compound further comprises a compound represented by Formula 4:

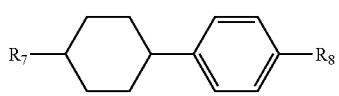

Formula 4 wherein $R_7$ represents a substituted or unsubstituted $C_1$-$C_{10}$ alkyl group or a substituted or unsubstituted $C_1$-$C_{10}$ alkoxy group and $R_8$ represents a $C_1$-$C_5$ alkyl group or a $C_1$-$C_5$ alkoxy group, a compound represented by Formula 5:

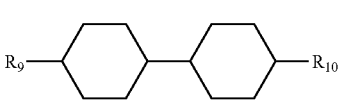

Formula 5 wherein $R_9$ represents a substituted or unsubstituted $C_1$-$C_{10}$ alkyl group or a substituted or unsubstituted $C_1$-$C_{10}$ alkoxy group and $R_{10}$ represents a $C_1$-$C_5$ alkyl group or a $C_1$-$C_5$ alkoxy group, or a mixture thereof.

11. The liquid crystal display of claim 10, wherein the polar compound further comprises a compound represented by Formula 6:

Formula 6

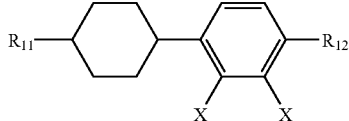

wherein X represents a halogen, $R_{11}$ represents a substituted or unsubstituted $C_1$-$C_{10}$ alkyl group or a substituted or unsubstituted $C_1$-$C_{10}$ alkoxy group and $R_{12}$ represents a $C_1$-$C_5$ alkoxy group, a compound represented by Formula 7:

Formula 7

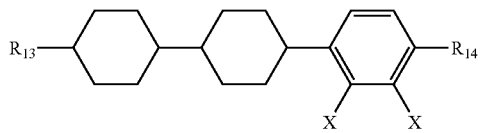

wherein X represents a halogen, $R_{13}$ is a substituted or unsubstituted $C_1$-$C_{10}$ alkyl group or a substituted or unsubstituted $C_1$-$C_{10}$ alkoxy group and $R_{14}$ represents a $C_1$-$C_5$ alkoxy group, a compound represented by Formula 8:

Formula 8

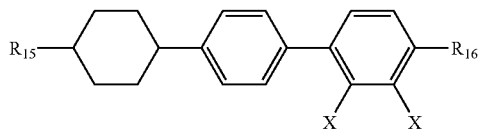

wherein X represents a halogen, $R_{15}$ is a substituted or unsubstituted $C_1$-$C_{10}$ alkyl group or a substituted or unsubstituted $C_1$-$C_{10}$ alkoxy group and $R_{16}$ represents a $C_1$-$C_5$ alkoxy group, and a compound represented by Formula 9:

Formula 9

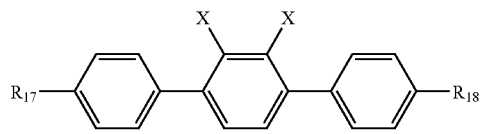

wherein X represents a halogen, $R_{17}$ represents a substituted or unsubstituted $C_1$-$C_{10}$ alkyl group or a substituted or unsubstituted $C_1$-$C_{10}$ alkoxy group and $R_{18}$ represents a $C_1$-$C_5$ alkoxy group, or a mixture thereof 12. The liquid crystal display of claim 11, wherein the liquid crystal layer has a thickness of about 3.1 micrometers to about 3.3 micrometers.

13. The liquid crystal display of claim 12, wherein the liquid crystal composition has a refractive anisotropy of about 0.100 to about 0.103.

14. The liquid crystal display of claim 13, wherein the liquid crystal composition has a dielectric anisotropy of about −3.2 to about −2.7.

15. The liquid crystal display of claim 1, wherein the second drain electrode and the third source electrode are electrically connected to each other.

16. The liquid crystal display of claim 15, further comprising
a step-down capacitor electrically connected to the third drain electrode; and
a step-up capacitor electrically connected to the third drain electrode and the second sub-pixel electrode.

17. The liquid crystal display of claim 1, wherein the liquid crystal layer has a thickness of about 3.1 micrometers to about 3.3 micrometers.

18. The liquid crystal display of claim 1, wherein the liquid crystal composition has a refractive anisotropy of about 0.100 to about 0.103.

19. The liquid crystal display of claim 1, wherein the liquid crystal composition has a splay elastic constant (K11) equal to or greater about 13.6 newtons and a bend elastic constant (K33) equal to or greater than about 13.8 newtons.

20. The liquid crystal display of claim 1, wherein the liquid crystal display has a grey-to-grey (G-G) response time of less than 5 milliseconds.

* * * * *